United States Patent [19]

Bender et al.

[11] Patent Number: 5,380,800
[45] Date of Patent: Jan. 10, 1995

[54] PROCESS FOR THE PREPARATION OF MODIFIED PHENOLIC RESINS

[75] Inventors: Albert Bender, Mainz; Wolfgang Dathe, Wiesbaden, both of Germany

[73] Assignee: Hoechst Aktiengesellschaft, Germany

[21] Appl. No.: 213,719

[22] Filed: Mar. 16, 1994

Related U.S. Application Data

[63] Continuation of Ser. No. 17,631, Feb. 12, 1993, abandoned.

[30] Foreign Application Priority Data

Mar. 4, 1992 [DE] Germany ............................ 4206697

[51] Int. Cl.⁶ .............................................. C08L 61/00
[52] U.S. Cl. .............................. 525/133.5; 525/501.5; 528/129; 528/149; 528/155
[58] Field of Search ...................... 528/129, 149, 155; 525/133.5, 501.5

[56] References Cited

U.S. PATENT DOCUMENTS

| | | | |
|---|---|---|---|
| 3,028,348 | 4/1962 | Castan et al. | 525/508 |
| 3,041,298 | 6/1962 | Berglund et al. | 525/508 |
| 4,097,463 | 6/1978 | Culbertson | 260/57 A |
| 4,182,697 | 1/1980 | Schmidt et al. | 260/19 R |
| 4,398,016 | 8/1983 | Homma et al. | 528/158.5 |
| 4,578,448 | 3/1986 | Brode et al. | 528/139 |
| 4,731,430 | 3/1988 | Kempter et al. | 528/139 |
| 5,073,623 | 12/1991 | Prantl et al. | 530/210 |
| 5,096,996 | 3/1992 | Hesse et al. | 528/129 |

*Primary Examiner*—John Kight, III
*Assistant Examiner*—Richard Jones
*Attorney, Agent, or Firm*—Bierman and Muserlian

[57] ABSTRACT

Process for the preparation of modified phenolic resins in which the starting components used for preparation of these modified phenolic resins are subjected to a condensation reaction under pressure and in the presence of an inert organic solvent which forms an azeotrope with water, and in which the water is removed from the reaction mixture continuously by azeotropic distillation. An improved space/time yield is achieved by this pressure distillation.

4 Claims, No Drawings

PROCESS FOR THE PREPARATION OF MODIFIED PHENOLIC RESINS

PRIOR APPLICATION

This application is a continuation of U.S. patent application Ser. No. 017,631 filed Feb. 12, 1993, now abandoned.

The invention relates to an improved process for the preparation of modified phenolic resins, which are preferably employed as binder resins for printing inks, in which the water formed by polycondensation during the preparation is eliminated by azeotropic distillation.

It is prior art to use modified phenolic resins as binder resins for printing inks, such as, for example, inks for gravure or offset printing. These resins are prepared by polycondensation of natural resin acids and/or ethylenically unsaturated hydrocarbon resins with phenols and aldehydes, which can also be in the form of resols or novolaks, during which, preferably, $\alpha,\beta$-ethylenically unsaturated carboxylic acids or derivatives thereof, esterifying agents, fatty acids, ethylenically unsaturated monomers, salt-forming agents and catalysts can be co-used as further modifying agents. These modified phenolic resins can therefore also be interpreted as natural resin acid esters, hydrocarbon resins or resinates which are modified with phenolic resins.

The reaction of these components can be carried out in a known manner by heating in the desired proportions either in a one-pot process or by subsequent metering of individual components into the natural resin and/or unsaturated hydrocarbon resin, which has/have been brought to the reaction temperature, and stepwise heating from about 80° C. up to temperatures of 300° C., the water of reaction being distilled off, until the desired properties are achieved.

The addition of the phenolic resin, especially if resols are used, to the resin melt is advantageously carried out at relatively low temperatures; about 150° to 180° C. are typical. At higher addition temperatures, in particular, otherwise uncontrolled self-condensation reactions of the phenolic resin occur, which may influence the properties of the end product in a negative manner. If the resol is first prepared in the resin melt by in situ reaction from the individual aldehyde and phenol components during the polycondensation, even lower temperatures of about 120° C. to 160° C. are necessary, in order to avoid the aldehyde component, which is usually volatile under these reaction conditions, from distilling off prematurely. If the reaction is carried out in a closed vessel, that is to say under pressure, low temperatures are likewise advantageous for limiting the increase in pressure. This particularly applies to formaldehyde, which is most often used. The mixture can only thereafter be heated to high temperatures to accelerate the polycondensation, water originating from condensation reactions of the resol with the resin component first starting to distill off from the mixture. If appropriate, this is then additionally accompanied by water originating from esterification reactions with a polyol used in the polycondensation or from the reaction with a salt-forming agent. However, this direct removal by distillation can lead to problems which render a trouble-free course of the reaction, which is essential for preparation on an industrial scale, more difficult or even impossible. In particular, as the degree of condensation progresses, the reaction medium separates into an organic resin phase and an aqueous phase. Precisely during heating to temperatures of about 160° to 220° C., these resin melts, which are then heterogeneous mixtures, can display viscosities which delay elimination of the water formed. Water accordingly becomes concentrated in the melt, and then distils off suddenly from the mixture, because of the energy build-up and overheating of the phases, during the subsequent rise in temperature and the associated reduction in viscosity of the heterogeneous melt mixture. Hazardous delays in boiling thus occur, which may lead to the tank foaming over or the contents of the tank being ejected. For safety reasons, there is therefore a need to carry out the reaction much more slowly than would be possible for kinetic reasons.

In practice, this means a considerable loss in time or a considerably reduced time and space yield, since the reaction can be carried out only with reduced charging because of the resulting foam comprising water surrounded by liquid resin.

The present invention was thus based on the object of discovering an advantageous process route, the difficulties and disadvantages described being overcome.

The invention relates to a process for the preparation of modified phenolic resins, in which the starting components are subjected to a condensation reaction under pressure and in the presence of an inert organic solvent which forms an azeotrope with water, and in which the water is removed from the reaction mixture continuously by azeotropic distillation.

As is known, these modified phenolic resins are prepared by reaction of natural resin acids and/or ethylenically unsaturated hydrocarbon resins with phenols and aldehydes, in which, preferably, $\alpha,\beta$-ethylenically unsaturated carboxylic acids or derivatives thereof, esterifying agents, fatty acids, ethylenically unsaturated monomers, salt-forming agents and catalysts can be co-used, if appropriate, as further modifying agents.

The phenols and aldehydes can also be subjected to condensation reactions separately. Instead of phenols and aldehydes, the resulting resols or novolaks are then employed for the preparation of the modified phenolic resins.

Possible starting components are, in particular, the following compounds:

A) Mononuclear or polynuclear phenols, preferably those which are polyfunctional towards oxo compounds, in particular phenol, $(C_1-C_{12})$-alkylphenols, aryl- or aralkylphenols, cresols, 1,3,5-xylenols, isopropyl-, p-tert-butyl-, amyl-, octyl- and nonylphenol, diphenylolpropane, phenylphenol, cumylphenol and addition products thereof from phenols and ethylenically unsaturated monomers, preferably $\alpha$-methylstyrene, $\alpha$-chlorostyrene, vinyltoluene or cyclopentadiene, B) aldehydes or aldehyde acetals, preferably aliphatic $(C_1-C_7)$-aldehydes, in particular formaldehyde in its various monomeric, oligomeric and polymeric forms, acetaldehyde, butyraldehyde, isobutyraldehyde and furthermore benzaldehyde, furfural and glyoxal, as well as phenol-resols prepared from components of substance group A) and B), C) natural resins or natural resin acids, preferably colophony, root resin, tall oil resin and disproportionated or partly hydrogenated or dimerized natural resin of any desired origin. Mixtures of natural resins or natural resin acids and $\alpha,\beta$-ethylenically unsaturated carboxylic acids or anhydrides thereof, in particular fumaric acid, maleic acid, maleic anhydride, itaconic acid, cinnamic acid, acrylic acid, methacrylic acid or reaction products thereof, are often advantageously used, D) ethylenically unsaturated hydrocarbon resins, preferably polymers or oligomers of mono- and/or polyethylenically unsaturated ($C_5$–$C_9$)-hydrocarbons, in particular from the group comprising isoprene, cyclopentadiene, indene, cumarone and styrene, which can also be present as copolymers with the compounds of substance group C), E) esterifying agents for esterification of the reaction products of phenolic resins and compounds of substance groups C) and/or D), preferably polyfunctional alcohols, in particular bifunctional alcohols, for example glycols, or trifunctional alcohols, for example trimethylolethane, trimethylolpropane or glycerol, or tetrafunctional alcohols, for example pentaerythritol, or pentafunctional alcohols, for example dimerized trimethylolpropane, or hexafunctional alcohols, for example dimerized pentaerythritol, F) condensation catalysts and salt-forming agents, inter alia for the formation of resols from phenols and aldehydes or aldehyde acetals and for the esterification reactions or resinate formation, preferably oxides, hydroxides, carbonates, acetates of metals, in particular of calcium, magnesium or zinc, and furthermore amines, for example triethylamine, and G) fatty acids for resin modification, preferably animal or plant fatty acids or fatty acids obtained by refining, and furthermore fatty compounds, for example fats and fatty acid glycerol esters, in particular in the form of vegetable or animal oils, for example tall oil, cottonseed oil, soya oil, linseed oil, wood oil or fish oil.

Possible inert organic solvents which form an azeotrope with water (entraining agents) are, preferably, saturated aliphatic or aromatic hydrocarbons, the boiling points of which under normal pressure are preferably between 100° and 250° C. Entraining agents of even higher boiling point have the disadvantage that they are distilled off only slowly from the highly viscous melts in the preferred reaction temperature range, and if appropriate must be removed over long distillation times under reduced pressure in vacuo when the reaction has ended; the product properties may thereby be modified in an undesirable manner because of further condensation reactions.

Saturated aliphatic or aromatic hydrocarbons, the boiling points of which under normal pressure are, in particular, between 100° and 200° C. are therefore preferred possible entraining agents, since, in particular, they are distilled off without problems from the melts at the prevailing reaction temperatures of about 250° C. To prevent these entraining agents from escaping from the mixtures too early by evaporation, and to be able to maintain the high reaction temperature, however, the azeotropic distillation must be carried out under pressure during the reaction since, as is known, the boiling point is then increased. This embodiment is therefore particularly advantageous and hence preferred. Preferred alkanes which are to be mentioned are, in particular, hexane, decane, mixtures of aliphatic hydrocarbons, such as are present, for example, in gasoline or in corresponding petroleum fractions, and toluene or xylene. The amount of solvent is in general up to 20% by weight, preferably 5% by weight, based on the solids content of the reaction mixture.

The process is carried out in a reactor, for example a customary pressure tank, fitted with a stirrer, heating, a thermostat, a feed device, a reflux condenser and a water separator. For preparation of a natural resin acid ester modified with phenolic resin, for example, a procedure is followed in which an esterifying agent and condensation catalyst, and the necessary amount of xylene in order to be able to carry out a continuous circulatory distillation, are added to the molten natural resin at 80° to 220° C. The resol is then added dropwise, the water already formed being removed from the reaction mixture at the xylene circulation. Azeotropic removal of the water by distillation in this prior stage under normal pressure takes about 1 to 2 hours. The actual process according to the invention is then carried out. For this, the apparatus is sealed pressure-tight, and the heating is adjusted to 220° to 270° C., xylene constantly distilling in circulation and the water formed being removed immediately from the mixture, so that this remains homogeneous. Since the xylene/water mixture which constantly evaporates withdraws energy from the resin melt and therefore cools this, which would prevent heating up to high temperatures, the system is now forced under pressure by means of an inert gas, such as, for example, nitrogen, whereupon the boiling point of the azeotrope and the entraining agent is increased. The pressure is 1 to 20, preferably 1.5 to 10 bar. A boiling point of about 220° C. can be established, for example, under a pressure of 6 bar in this manner. This azeotropic removal of the water by distillation under pressure is usually carried out over a period of about 10 to 15 hours in esterification reactions.

After the majority of the water has distilled off, if the mixture is then let down to normal pressure, xylene distills off, and the reaction can be brought smoothly to completion under the desired reaction conditions.

It goes without saying that this general procedure must be varied and modified according to the particular starting compounds, for which merely a few orientating experiments are necessary. In the case where the resols or novolaks are first formed in situ from phenols and aldehydes, it may be appropriate, for example, for the first stage not to be carried out under normal pressure, but for the pressure vessel to be kept closed and the stage to be carried out under the pressure which is then established at the chosen reaction temperature.

In contrast to the known processes, the water introduced into the process according to the invention and formed in the course of the process is removed continuously and the condensation reaction takes place in a homogeneous phase. This eliminates one of the reasons for the development of an energy build-up. The existence of a homogeneous phase, the mobility of which is additionally increased by higher temperatures and the presence of solvents, facilitates the reaction considerably and thus leads to higher time yields. The space yield can also be increased by continuous discharge of the water of reaction. It rises from 50 to 70% in known processes to 60 to 80% according to the invention. The process according to the invention is thus characterized not only by an improvement in the time yield but also by an improvement in the space yield.

The modified phenolic resins prepared by the process according to the invention are used in the same manner and for the same purposes as the resins obtained by conventional processes. However, by the diverse possibilities of variation of the process according to the invention, it is possible for the properties of printing ink binder resins to be varied in many ways and to be adapted to suit the particular requirements even better. In particular, however, the printing ink binder resins prepared to date by known processes can be prepared more easily, more reliably and in a constant quality with a very good reproducibility by the process according to the invention. Printing ink binder resins which cannot be produced by conventional methods have even become accessible by the novel process.

The resins prepared by the process according to the invention are preferably used for the preparation of printing inks. However, it is possible to employ them in other fields known for this class of product, i.e., for example as reinforcing resins for rubber and elastomers, as tackifiers for rubber, as hot-melt adhesives, as binders for friction linings, as impregnating agents for organic and/or inorganic fibers and as binders in coverings, coatings and paints.

The invention is illustrated by the following examples.

COMPARISON EXAMPLE 1

Preparation of a phenolic resin-modified natural resin acid ester by the known process 527 g of commercially available colophony, which is also called natural resin or natural resin acid, are melted under an $N_2$ atmosphere in a 2 liter pressure vessel which is heated with heat transfer oil and has a stirrer, thermometer and filling tube, and 25.3 g of maleic anhydride are metered into the hot resin melt at 160° C., whereupon an exothermic reaction starts, after subsidence of which the reaction mixture is kept at 160° C. for a further hour. 276 g of nonylphenol, 68 g of pentaerythritol and 5 g of magnesium oxide are then added to the mixture at 160° C., the temperature is reduced to 110° C., 78 g of paraformaldehyde are added, the vessel is sealed pressure-tight, and the mixture is stirred at 110° C. for 1 hour. Thereafter, the temperature is increased to 130° C. in the course of 20 minutes, whereupon formation of the phenol-resol starts, water being split off. The reaction temperature is kept at 130° C. for a further 2 hours, and the vessel is let down cautiously to normal pressure, the water distilling off from the heterogeneous melt via an attached condenser. When this distillation has stopped, the temperature is increased to 265° C., further condensation occurring, with water being split off. However, the heating up can be carried out only very slowly, since the viscous heterogeneous resin/water mixture formed rises in the reaction vessel, and foams out of the reaction vessel if too much energy is supplied. The reaction must therefore be monitored closely in this phase. 265° C. is reached after about 4 hours. The condensation reaction is then carried out at this temperature until an acid number of less than 25 mg of KOH/g of resin is reached. Finally, to remove volatile contents, the vessel is evacuated under 100 mbar for a further 5 minutes and the reaction is brought to completion. The reaction time is about 18 hours. A 40 percent strength solution of the resin in a high-boiling petroleum having a boiling range of 240°–270° C. and an aniline point of 72° C. has a viscosity at 23° C. of between 70 and 120 dPa.s.

COMPARISON EXAMPLE 2

The procedure is as in Comparison Example 1, with the modification that the weight of the reactants is increased by in each case 50% in order to increase the tank yield. However, because of the foam which occurs and which emerges from the reaction vessel, the reaction can no longer be carried out in the manner described.

EXAMPLE 1 (according to the invention)

Preparation of a binder resin with the reactants of Comparison Example 1 and the weights of Comparison Example 2, but a higher space/time yield 790 g of commercially available colophony are melted under an $N_2$ atmosphere in a 2 liter pressure vessel which is heated with heat transfer oil and has a stirrer, thermometer and filling tube, and 38 g of maleic anhydride are metered into the hot resin melt at 160° C., whereupon an exothermic reaction starts, after subsidence of which the reaction mixture is kept at 160° C. for a further hour. 414 g of nonylphenol, 102 g of pentaeryth ritol and 7.5 g of magnesium oxide are then added to the mixture at 160° C., the temperature is reduced to 110° C., 117 g of paraformaldehyde and 50 ml of xylene are added, the vessel is sealed pressure-tight and the mixture is stirred at 110° C. for 1 hour. Thereafter, the temperature is increased to 130° C. in the course of 20 minutes, whereupon formation of the phenol-resol starts, water being split off. The reaction temperature is kept at 130° C. for a further 2 hours, and the vessel is then cautiously let down into an attached water separator, charged with xylene, which has a receiver which can accommodate all the water formed during the reaction, an azeotropic mixture of water and xylene distilling off. The temperature for the heating of the pressure vessel is now adjusted to 265° C. The temperature of the mixture then increases up to about 180° C. and, because of the evaporating azeotrope and the circulating xylene, does not then rise further. The apparatus is now sealed pressure-tight and adjusted to an inert pressure of 2 bar with nitrogen. Thereafter, the reaction mixture starts to heat up because of the now higher boiling point of the volatile substances, further water formed being eliminated immediately and constantly from the low-viscosity melt due to the circulating agent. After a mixture temperature of 230° C. has been reached without difficulty in the course of about 1 hour, whereupon a pressure of 5 bar is established, the circulatory distillation is interrupted and the mixture is let down slowly to normal pressure. During this operation, the xylene starts to distill off, while the mixture temperature increases to 265° C. in the course of about 0.5 hour. The condensation is then carried out at this temperature until an acid number of less than 25 mg of KOH/g of resin is reached. Finally, to remove volatile contents, the mixture is evacuated at 100 mbar for a further 5 minutes and the reaction is brought to completion. The reaction time is about 15 hours. A 40% strength solution of the resin in a high-boiling petroleum of boiling range 240°–270° C. has a viscosity at 23° C. of between 70 and 120 dPa.s.

COMPARISON EXAMPLE 3

Experiment to prepare a phenolic resin-modified hydrocarbon resin by known processes 362 g of a commercially available cyclopentadiene resin and 225 g of colophony are melted under an $N_2$ atmosphere in a 2 liter pressure vessel which is heated with heat transfer oil and has a stirrer, thermometer and filling tube, and 320 g of a resol (prepared by known methods from 652 g of p-t-butylphenol, 123 g of 37% strength formaldehyde, 242 g of paraformaldehyde and 13 g of 33% strength sodium hydroxide solution; viscosity/23° C. 340–370 mPa.s, formaldehyde content 6.5–7.5%) are metered into the hot resin melt at 160° C. in the course of one hour. During this operation, the water formed is distilled off via a descending condenser. When this distillation has stopped, the temperature is increased to 255° C., further splitting-off of water starting. However, the heating up can be carried out only very slowly, since the viscous heterogeneous resin/water mixture formed rises in the reaction vessel. Finally, the reaction is no longer controllable, since the resin melt foams out of the vessel suddenly at a mixture temperature of about 190° C.

EXAMPLE 2

Preparation of a phenolic resin-modified hydrocarbon resin which can be employed as a binder resin for offset or gravure printing inks, the recipe of Comparison Example 3 being used.

362 g of a commercially available cyclopentadiene resin and 225 g of colophony are melted under an $N_2$ atmosphere in a 2 liter pressure vessel which is heated with heat transfer oil and has a stirrer, thermometer and filling tube, and 320 g of a resol (prepared by known methods from 652 g of p-t-butylphenol, 123 g of 37% strength formaldehyde, 242 g of paraformaldehyde and 13 g of 33% strength sodium hydroxide solution; viscosity/23° C. 340-370 mPa.s, formaldehyde content 6.5-7.5%) are metered into the hot resin melt at 160° C. in the course of one hour. During this operation, the water formed is distilled off as an azeotropic mixture, with xylene as the circulating agent, via a connected water separator with a receiver which can accommodate all the water formed during the reaction. The temperature of the heating of the pressure vessel is now adjusted to 255° C. The temperature of the mixture then increases up to about 180° C., and does not rise further because of the evaporating azeotrope and the circulating xylene. The apparatus is now sealed pressure-tight and adjusted with nitrogen to an inert pressure of 2 bar. Thereafter, the reaction mixture starts to heat up because of the now higher boiling point of the volatile substances, further water formed being eliminated immediately and constantly from the low-viscosity melt by the circulating agent. When a mixture temperature of 255° C. has been reached without difficulty within about 3 hours, during which a pressure of up to 8 bar can be established, the circulatory distillation is interrupted and the mixture is let down slowly to normal pressure. The xylene starts to distill off. The condensation reaction is carried out until an acid number of less than 35 mg of KOH/g of resin is reached. Finally, to remove volatile contents, the mixture is evacuated under 100 mbar for a further 5 minutes and the reaction is brought to completion. The reaction time is about 12 hours. A 50% strength solution of the resin in toluene has a viscosity at 23° C. of between 120 and 160 mPa.s.

EXAMPLE 3

Preparation of a phenolic resin-modified resinate as a binder resin for gravure printing of illustrations 1350 g of a commercially available dimerized tall oil resin are melted under an $N_2$ atmosphere in a 2 liter pressure vessel which is heated with heat transfer oil and has a stirrer, thermometer and filling tube, and 13 g of maleic anhydride are metered into the hot resin melt at 160° C. After the mixture has been subsequently stirred at 160° C. for one hour, 26 g of a resol (prepared by known processes from 590 g of phenol, 103 g of 37% strength formaldehyde, 271 g of paraformaldehyde and 37 g of 33% strength sodium hydroxide solution; viscosity/23° C. 250-350 mPa.s, formaldehyde content 6.5-7.5%) are metered in over a period of half an hour, and 108 g of calcium hydroxide suspended in 200 g of xylene are metered in over a period of a further half an hour. During this operation, the water formed is distilled off as an azeotropic mixture, with xylene as the circulating agent, via a connected water separator with a receiver which can accommodate all the water formed during the reaction. The temperature of the heating of the pressure vessel is now adjusted to 250° C. The mixture temperature of the very viscous mixture then increases up to about 180° C., and no longer increases further because of the evaporating azeotrope and the circulating xylene. The apparatus is now sealed pressure-tight and brought with nitrogen to an inert pressure of 2 bar. Thereafter, the reaction mixture starts to heat up because of the now higher boiling point of the volatile substances, further water formed being eliminated immediately and constantly from the now low-viscosity melt due to the circulating agent. When a mixture temperature of 220° C. has been reached without difficulty in the course of about 1 hour, during which a pressure of 4 bar is established, the circulatory distillation is interrupted and the mixture is let down slowly to normal pressure. During this operation, the xylene starts to distill off. The condensation reaction is then carried out until an acid number of less than 40 mg of KOH/g of resin is reached. Finally, to remove volatile contents, the mixture is evacuated under 100 mbar for a further 5 minutes and the reaction is brought to completion. The reaction time is about 12 hours. A 40% strength solution of the resin in toluene has a viscosity at 23° C. of between 200 and 400 mPa.s.

We claim:

1. A process for the preparation of a modified phenolic resin, which comprises subjecting the starting components of natural resin acids and oligomeric or polymeric ethylenically unsaturated hydrocarbon resins, phenols and aldehydes, which phenols and aldehydes can also be present as resols or novolaks, and, optionally α, β-ethylencially unsaturated carboxylic acids or derivatives thereof, esterifying agents, fatty acids, ethylenically unsaturated monomers, salt-forming agents and catalysts to a condensation reaction under pressure and in the presence of an inert organic solvent which forms an azeotrope with water, and during this procedure removing the water from the reaction mixture continuously by azeotropic distillation by heating to 220° to 270° C.

2. The process of claim 1 wherein the pressure is 1.5 to 10 bar.

3. The process as claimed in claim 1, wherein the water is first distilled off azeotropically under normal pressure.

4. The process as claimed in claim 1, wherein the water is distilled off azeotropically under a pressure of up to 20 bar.

* * * * *